United States Patent [19]
Oropallo

[11] Patent Number: 5,273,077
[45] Date of Patent: Dec. 28, 1993

[54] TEST CAP UNIT FOR SEALED FITTING

[75] Inventor: Robert A. Oropallo, San Marino, Calif.

[73] Assignee: American Brass & Aluminum Foundry Company, Inc., Los Angeles, Calif.

[21] Appl. No.: 977,848

[22] Filed: Nov. 17, 1992

Related U.S. Application Data

[63] Continuation-in-part of Ser. No. 864,304, Apr. 6, 1992, which is a continuation-in-part of Ser. No. 677,504, Mar. 29, 1991.

[51] Int. Cl.$^5$ .............................................. F16L 55/10
[52] U.S. Cl. ........................................ 138/90; 138/89; 138/92; 73/40.5 R; 73/49.1
[58] Field of Search ............. 138/89, 90, 96 R, 96 T, 138/92; 73/40.5 R, 49.1, 49.2, 49.3, 49.5, 49.8, 46; 277/1, 9.5; 4/255.07, 580, 699, 680, 681, 682

[56] References Cited

U.S. PATENT DOCUMENTS

| | | |
|---|---|---|
| 428,364 | 5/1890 | Baguley . |
| 952,240 | 3/1910 | Deming ................ 4/255.07 |
| 962,577 | 6/1910 | Mueller ................ 4/680 |
| 1,068,039 | 7/1913 | Clark ................ 4/680 |
| 1,875,615 | 9/1932 | Kennedy ................ 138/90 |
| 2,036,614 | 4/1936 | Tharp ................ 4/255.07 |
| 2,167,597 | 7/1939 | Webb ................ 138/92 |
| 2,255,921 | 9/1941 | Fear . |
| 2,444,340 | 6/1948 | Donahue ................ 4/680 |
| 2,477,478 | 7/1949 | Donahue ................ 4/680 |
| 2,739,317 | 3/1956 | Abresch ................ 4/679 |
| 2,950,033 | 8/1960 | Henchert ................ 138/89 |
| 3,173,443 | 3/1965 | Saville ................ 138/90 |
| 3,613,936 | 10/1971 | Kaiser et al. ................ 138/89 |
| 3,654,965 | 4/1972 | Gramain ................ 138/89 |
| 3,982,421 | 9/1976 | Wallace ................ 73/46 |
| 3,987,930 | 10/1976 | Fuson ................ 138/96 R |
| 4,077,250 | 3/1978 | Wesch . |
| 4,239,602 | 12/1980 | La Batte ................ 138/92 |
| 4,407,171 | 10/1983 | Hasha et al. . |
| 4,719,687 | 1/1988 | Nanny . |
| 4,739,799 | 4/1988 | Carney et al. . |
| 4,763,510 | 8/1988 | Palmer . |
| 4,809,751 | 3/1989 | McKenzie . |
| 4,838,075 | 6/1989 | Friedrich et al. . |
| 4,860,796 | 8/1989 | Hagin . |
| 5,004,119 | 4/1991 | Irwin ................ 4/255.07 |

Primary Examiner—James E. Bryant, III
Attorney, Agent, or Firm—William W. Haefliger

[57] ABSTRACT

A pipe fitting having an end wall and forming a port radially inwardly of the flange to align with the wall opening; an annular elastomeric seal positioned to be compressed between the wall and the work body wall for preventing leakage of fluid outwardly from the wall opening; a test cap unit spaced from the seal and aligned therewith to close off the opening and fastener structure extending through the cap unit and adjustably attached to the fitting for urging the cap unit into sealing relation with the inner side of the work body wall, about the opening, when the seal is compressed as aforesaid, whereby the cap unit then closes off the opening so that test liquid under pressure can be filled into the fitting to test for leakage; the cap unit having annular sealing structure facing toward the annular seal for sealing engagement with the wall inner side, the sealing structure comprising an elastomeric ring and the cap unit includes a plate carrying the ring, the ring consisting of resiliently deflectable material projecting from the plate. That material is typically sponge elastomer.

18 Claims, 4 Drawing Sheets

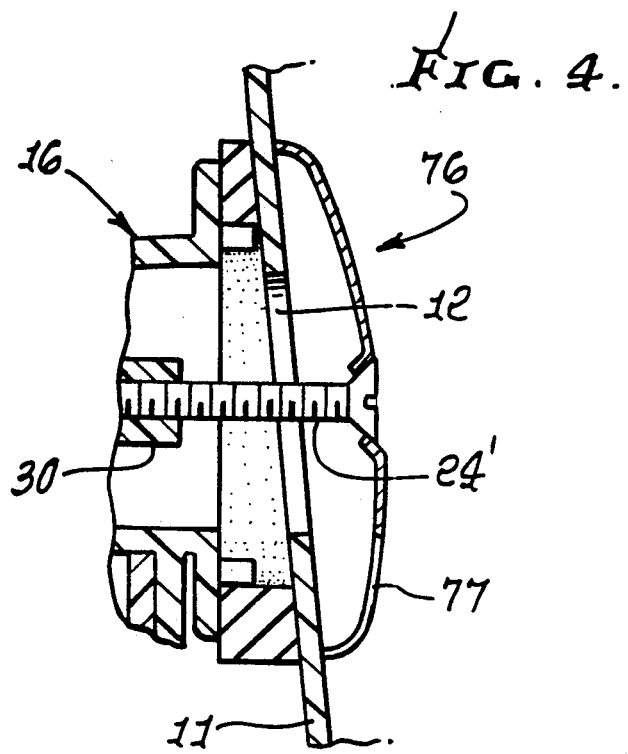
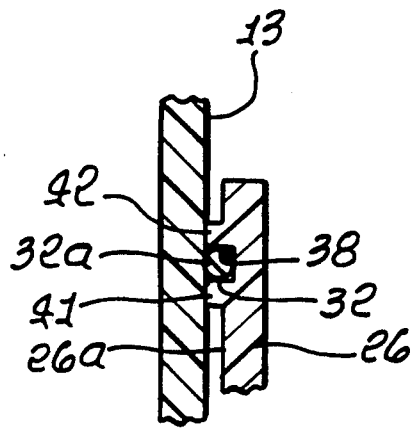
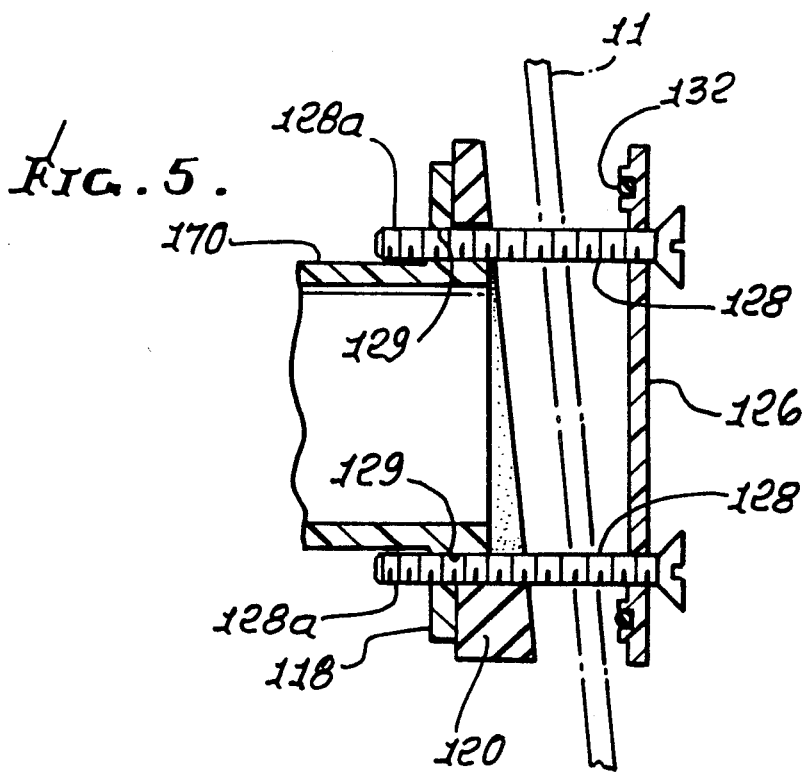

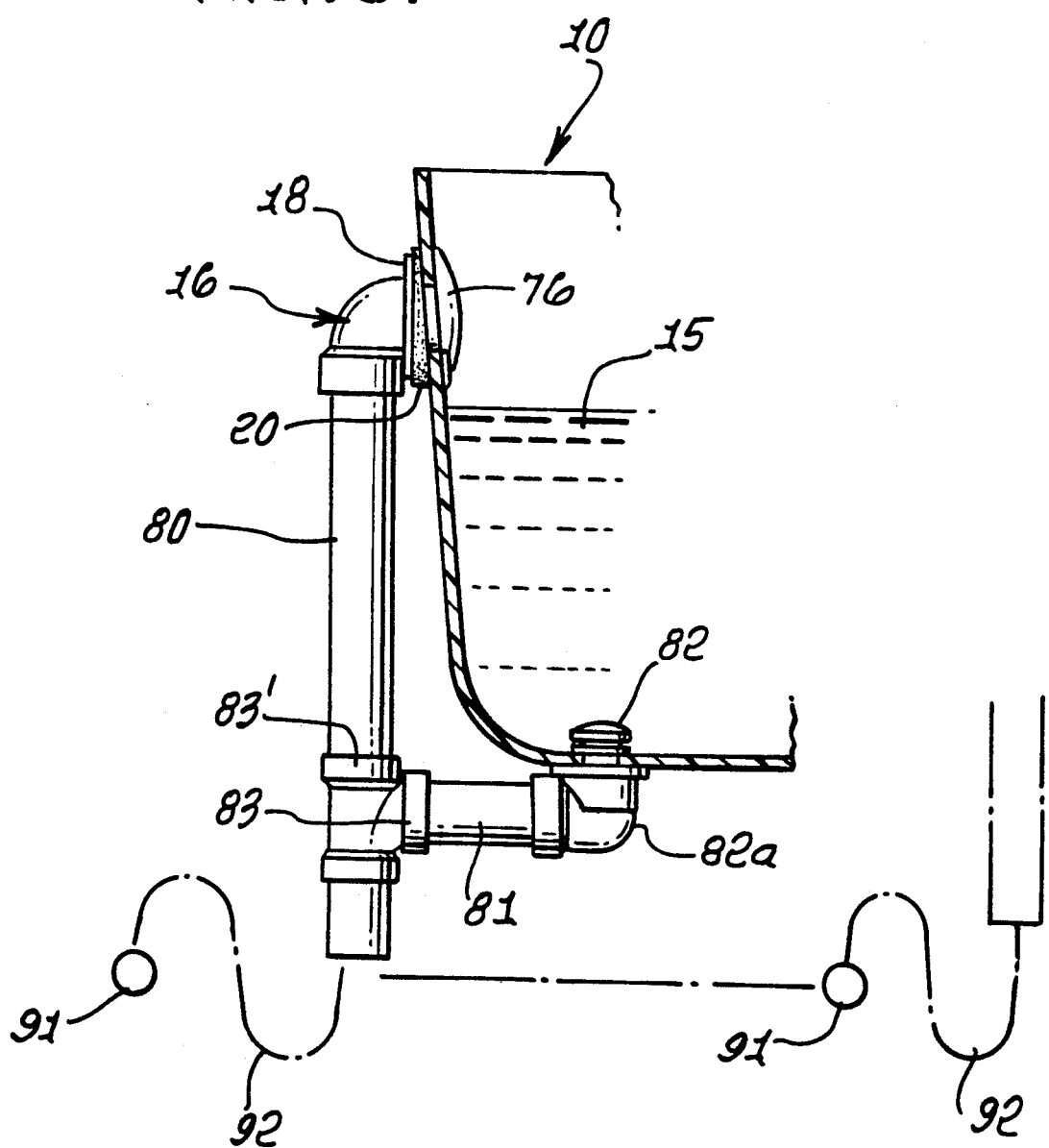

TEST CAP UNIT FOR SEALED FITTING

BACKGROUND OF THE INVENTION

This application is a continuation-in-part Ser. No. 864,304 filed Apr. 6, 1992, which is a continuation-in-part of Ser. No. 677,504 filed Mar. 29, 1991.

This invention relates generally to testing of pipe joints and seals used in plumbing applications; and more particularly, to pressure testing the pipe flange seal used at the drain outlet of a bathtub or the like, as well as associated pipe joints.

Pipe fittings, as used for drain purposes from bathtubs, require sealing against the tub wall to prevent leakage. Typically, compressible, annular, rubber seals are used between the fitting flanges and the outer side of the tub wall. Such seals require pressure testing during installation to determine whether any leakage will develop during overflow draining of water from the tub. There is need for a simple, reliable method and means to quickly test such seals, as well as the pipe joints, against leakage.

SUMMARY OF THE INVENTION

It is a major object of the invention to provide improved method and means to meet the above need. Basically, the invention relates to a combination of elements applicable to a tub wall having an opening between its inner and outer sides, the combination including a) a pipe fitting having an end wall, or flange, and forming a port radially inwardly of the flange to align with the wall opening, b) an annular, elastomeric seal positioned to be compressed between the end wall or flange and the work body wall for preventing leakage of fluid outwardly from the wall opening, c) a test cap unit spaced from the seal and aligned therewith to close off the opening, d) and fastener means extending through the cap unit and adjustably attached to the fitting for urging the cap unit into sealing relation with the inner side of the work body wall, about the wall opening, when the seal is compressed as aforesaid, whereby the cap unit then closes off the opening so that liquid under pressure can be filled into the fitting to test for leakage.

Typically, the cap unit itself has an annular sealing means facing toward the annular seal for sealing engagement with the wall inner side. That sealing means for example comprises an elastomeric o-ring, and the cap unit includes a plate carrying the o-ring. Also, the plate forms an annular groove in which a first annular part of the 0-ring is held, the o-ring including a second annular part protruding from the groove for sealing engagement with the inner side of the body wall. This allows the adjustable fastener means to protrude through the cap unit for connection with the pipe fitting, without disturbing the annular seal.

As will be seen, the fastener means may include one of the following:

i) a single fastener, including a head engaging the plate defined by the cap unit, and a threaded shank penetrating into and threadably attached to the pipe fitting;

ii) two fasteners, each including a head engaging the plate defined by the cap unit, and a threaded shank penetrating into and threadably attached to the fitting.

The invention also enables replacement of the test cap unit with a drain fitting cap installed at the inner side of the tub wall and attached by means of the same fastener means referred to. Another important feature of the invention is the provision for holding the fitting and seal in the same precise alignment with the wall opening and wall as existed during pressure testing, and during such replacement of the test cap unit with a drain cap, ensuring proper sealing during final clamp-up.

A further object includes the provision of a test cap seal ring which is resiliently deflectable. It may consist of resiliently compressible sponge elastomer; and, as will be seen, such a sponge ring typically has axial thickness between ⅜ inch and ¼ inch. Also, such a ring facilitates shifting adjustment of the cap, and may be compressed by the cap to greater extent at one side of the axis and to lesser extent at the opposite side of the axis.

These and other objects and advantages of the invention, as well as the details of an illustrative embodiment, will be more fully understood from the following specification and drawings, in which:

DRAWING DESCRIPTION

FIG. 3 is an enlarged fragmentary section taken on lines 3—3 of FIG. 2;

FIG. 4 is a fragmentary view like FIG. 1 but showing the test cap unit replaced by a fixture drain cap;

FIG. 5 is a plan view showing a modified assembly like that of FIG. 1, but employing two fasteners to hold the test cap unit in position;

FIG. 6 shows an assembly incorporating the final drain cap;

DETAILED DESCRIPTION

Figure 1:
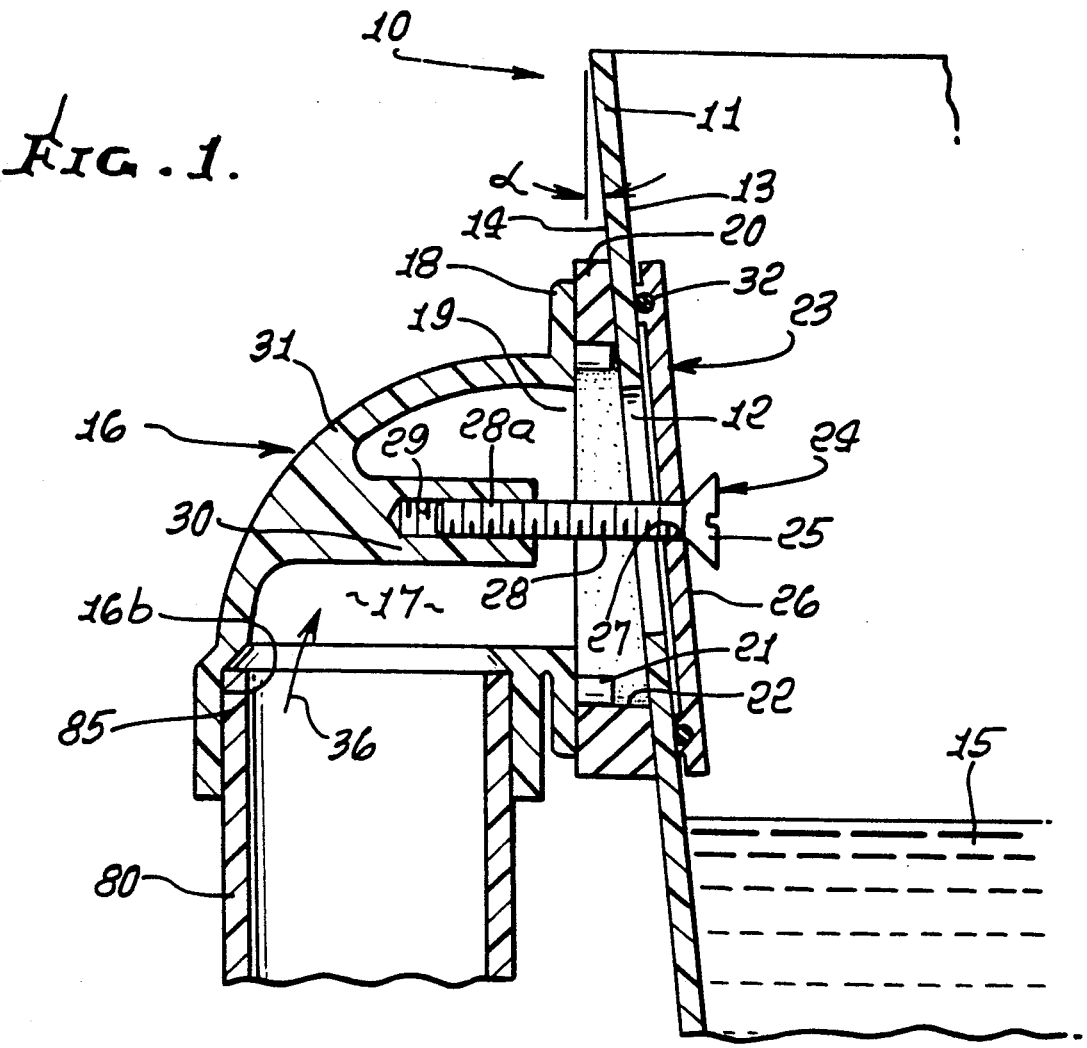
FIG. 1 is a vertical section taken through a device incorporating the invention, and attached to a wall.
Figure 2:
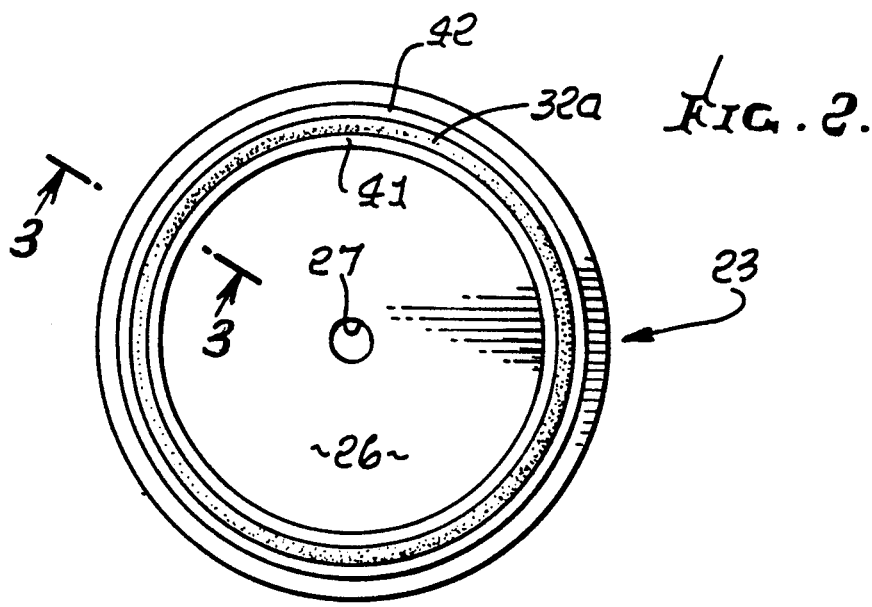
FIG. 2 is an enlarged frontal view of a test cap unit incorporating the invention.

In FIGS. 1 and 21 a bathtub 10 has an end wall 11 extending downwardly and inclined at an angle a as shown. An opening 12 is formed between the inner and outer wall surfaces 13 and 14 at an upper drain level. Normally, water 15 in the tub does not rise to the level opening 12; but, if it does, it passes through the opening to the pipe fitting and external drain pipe means for drainage. See such an external pipe 80 in FIG. 6, which extends vertically and is connected to short, horizontal, drain pipe 81 recessing drainage from a tube lower drain fitting 82. such pipes are typically made of plastic, joined together by adhesive at joints 83.

The external pipe fitting 16 shown is in the form of an elbow having a drain passage 17. A fitting flange 18 extends about a port 19 registered with the tub wall opening 12, when installed. An annular, elastomeric seal 20 is located between the flange 18 and the wall surface 14, about opening 12 for sealing off therebetween and preventing leakage of fluid outwardly from opening 12 and outwardly of the fitting. The seal 20 may typically have a wedge-shape in elevation, as shown, to enable desired engagement with the outer surface 14 of wall 11. Projections 21, integral with flange 18, project toward wall 11 at circular locations to position the bore 22 of the seal 20, locating the seal relative to the flange.

In accordance with the invention, a test cap unit 23 is spaced from the seal 20, at the inner side of wall 11, for closing off the opening 12. Also, fastener means is provided extending through the cap unit and adjustably attached to the fitting for urging the cap unit into sealing relation with the inner side of the work body wall, about the opening, when the seal is compressed as aforesaid, whereby the cap unit then closes off the opening 12 so that test liquid under pressure can be filled into the fitting 16 to test for leakage adjacent the elastomeric seal 20. The seal, consisting of foam rubber, is compressed to reduce its thickness between about 25% to 50%. As shown, the fastener means comprises a single fastener 24, including a head 25, engaging a plate 26, defined by the cap unit, and a shank 28 extending through an opening 27 in the plate. The shank is threaded at 28a, for threadably engaging an internal thread 29 in a projection 30 integral with the body 31 of the fitting 16. Projection 30 extends in 17 toward opening 12, as seen.

The cap unit has an annular sealing means facing toward the annular seal for sealing engagement with the wall inner side 13. As shown, the sealing means comprises an elastomeric o-ring 32 carried by the plate 26 so that the o-ring sealingly engages inner surface 13 of wall 11 and extends about opening 12. When the fastener is tightened, the 0-ring 32 compressively engages wall surface 13 to seal thereagainst; and the 0-ring and plate 26 block escape of test fluid or liquid supplied under pressure (see arrow 36) to the interior 17 of the fitting. This allows a pressure test of annular seal 20 from the bore side thereof, as desired, to determine if leakage exists between 20 and 18, or between 20 and 14.

FIG. 3 shows that plate 26 forms an annular groove 38 into which a first part of the 0-ring is received. The o-ring has a second annular part 32a protruding from the groove for sealing engagement with wall surface 13. Groove 38 is formed between the annular protrusions 41 and 42, ensuring spacing of cap plate wall 26a from the tub wall 13. During a pressure test, the tapered surface 25a of fastener head 25 sealingly engages the rim of the opening 27 through plate 26, and also compensates for the adjustment angularity of the plate 26 relative to vertical, as shown. That angle is $\alpha$.

A means to supply pressure fluid to the fitting interior 17 may comprise plastic pipe 80, adhesively joined to fitting bore 16b, at 85, to supply a desired head of liquid to the fitting interior 17 for the pressure test.

FIG. 5 shows in plan view the alternate use of two fasteners 128, extending through a cap plate 126, corresponding to plate 26. The fasteners have threaded shanks 128a threadably received in bores 129 in the fitting body 170, as shown. See also seal 120 corresponding to seal 20; and flange 118 corresponding to flange 18. The cap unit annular seal is shown at 132.

After completion of the pressure test, the cap unit 23 may be replaced by a drain cap 76 extending over the opening 12. Cap 76 has drain port 77 to pass overflow liquid in the tub to the exterior fitting 16, connectible to drain plumbing. The same or like fastener means 24' may be employed for connecting cap 76 to the projection 30 in FIG. 1. Equivalent dual fasteners may be used as in FIG. 5 to connect a drain cap to the tub wall.

In use, the parts are made-up as for pressure test, as seen in FIG. 1; and thereafter, as seen in FIG. 6, the plastic pipes 80 and 81 are glued together, as at joint 83; and pipe 80 is glued to fitting 17, as referred to. Pipe 81 has been rigidly connected to the drain fitting 82, as via elbow 82a. This rigidizes the external piping, so that when test cap 23 is removed, as by withdrawing fastener 24, the seal 20 and fitting 16 remain in the same precise alignment with the wall 11 and wall surface imperfections. Then, when drain cap 76 is installed and fastener 24 or 24' is tightened, the seal will engage the wall surface imperfections in the same way, re-establishing the precision seal. Also, the adhesive joints are not disturbed or cracked during such final attachment. The pipes 80 and 81, and/or joints at 83, 83', and 82a may be metallic. System piping and trap piping is seen at 91 and 92.

Steps of the method of employing the invention include:

i) tightening the fastener means to compress the seal against the wall and to clamp the test cap unit to the wall, closing the opening, ii) connecting external piping to the fitting to rigidly support the fitting, iii) applying water pressure internally of the piping and pipe fitting to test whether the elastomeric seal leaks, iv) loosening the fastener means and removing the test cap unit, and v) connecting a drain cap to the wall to cover the opening by retightening the fastener means to connect the cap to the fitting and to re-compress the seal.

Step ii) may include adhesively connecting the piping to the fitting and to drain fitting while the test cap unit remains clamped to the wall.

Further, in accordance with another aspect of the invention, steps i) and ii) are also carried out at a second work body wall opening using a second pipe fitting and a second elastomeric seal; the step iii) is also carried out to test whether the second seal leaks, at the same time as the first seal is tested.

In this way, a plurality of annular seals 20 at different locations in a home or building may be simultaneously tested.

Figure 7:
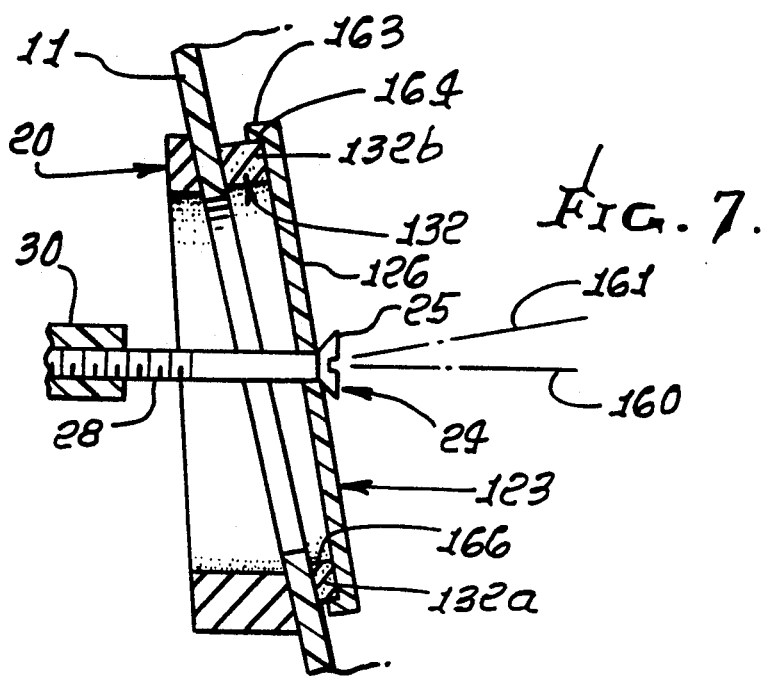
FIG. 7 is a view like FIG. 1 showing provision and use of a compressible, elastomeric, sponge seal.
Figure 8:
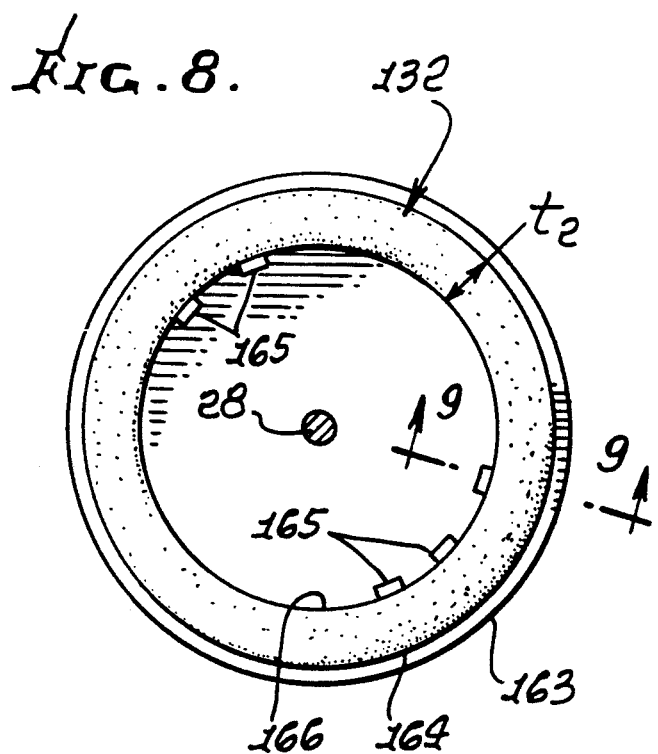
FIG. 8 is a frontal view of the seal, as shown in FIG. 7, and the cap retaining it.
Figure 9:
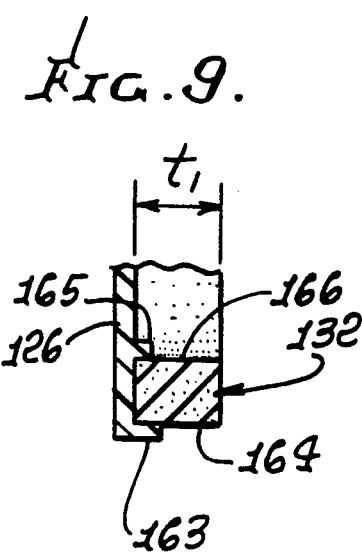
FIG. 9 is an enlarged section taken on lines 9—9 of FIG. 8.

In FIG. 7, the assembly and elements are like those of FIG. 1, except that the modified test cap unit 123 includes an elastomeric ring 132 that consists of foamed or sponge elastomeric material, to be resiliently deflectable, allowing greater adjustability of plate 126. See for example greater compression at 132a, below fastener axis 160 (and also below ring axis 161) than at 132b, above axis 160. The plate 126 can therefore extend more nearly normal to the fastener axis 160. Adjustability to different angled walls 11 is thereby also facilitated, enhancing the function and benefits of the seal 20 at the outer side of wall 11.

Cap plate 126 has an outer, annular flange 163 closely surrounding the outer, annular surface 164 of the ring furthest from the wall 11, to allow seal resilient compression, as described; and the plate 126 also has an annular series of shallow protrusions 165 extending close to the inner annular surface 166 of the ring farthest from wall 11, as shown. The flange 163 and protrusions 165 act to position the ring relative to the plate, during assembly to FIG. 7 condition; and they allow extreme, differential, resilient compression of the ring, as described. Angular relative shifting of the cap and fastener are also accommodated.

The axial thickness $t_1$ of the ring is typically between ⅜ inch and ¾ inch; and ring radial dimension $t_2$ between the ring bore 168 and outer periphery 164, is typically between ⅜ inch and ¾ inch. These dimensions are found to produce best results in terms of the functions referred to, for a ring whose overall diameter is between 2½ inches and 4 inches.

Ring 132 may be compressed, as referred to, to reduce its thickness between about 25% to 60%, maximum other rings of lesser compressibility may be used.

I claim:

1. In combination, for use with a work body wall having inner and outer sides, and an opening therethrough,
   a) a pipe fitting having an end wall and forming a port radially inwardly of the end wall to align with said wall opening,
   b) an annular elastomeric seal positioned to be compressed between said end wall and said work body wall for preventing leakage of fluid outwardly from said wall opening,
   c) a test cap unit spaced from said seal and aligned therewith to close off said opening,
   d) and fastener means extending through said cap unit and adjustably attached to said fitting for urging the cap unit into sealing relation with the inner side of said work body wall, about said opening, when said seal is compressed as aforesaid, whereby the cap unit then closes off said opening so that test liquid under pressure can be filled into said fitting to test for leakage,
   e) said cap unit having annular sealing means facing toward the annular seal for sealing engagement with said wall inner side, said sealing means comprising an elastomeric ring and said cap unit includes a plate carrying said ring, said ring consisting of resiliently deflectable material projecting from said plate.

2. The combination of claim 1 wherein said ring consists of resiliently compressible sponge elastomer.

3. The combination of claim 2 wherein said plate has an outer, annular flange engaging the periphery of said sponge elastomer ring to locate same relative to said fastener, the cap allowing relative angular shifting of the cap and fastener.

4. The combination of claim 2 wherein said plate forms an annular groove into which a first annular part of said ring is received, the ring including a second annular part protruding from said groove for compressible sealing engagement with the inner side of said body wall.

5. The combination of claim 1 wherein said fastener means protrudes through the cap unit.

6. The combination of claim 5 wherein said fastener means includes one of the following:
   i) a single fastener, including a head engaging the plate defined by the cap unit, and a threaded shank penetrating into and threadably attached to the fitting;
   ii) two fasteners, each including a head engaging the plate defined by the cap unit, and a threaded shank penetrating into and threadably attached to the fitting.

7. The combination of claim 1 including said work body wall, the outer side of which is compressively engaged by said seal, and the inner side of which is engaged by said cap unit to close off said wall opening.

8. The combination of claim 7 including means supplying fluid under pressure to said fitting bore for test pressurizing said seal between said flange and said work body wall.

9. The combination of claim 1 wherein said seal consists of foamed, elastomeric material.

10. The combination of claim 7 wherein said work body wall is defined by a liquid container.

11. The combination of claim 1 including pipe connected to said fitting to hold the seal and fitting in the same alignment with said wall and opening during replacement of the test cap with a drain cap, after said pressure test.

12. The combination of claim 1 wherein said ring defines an axis and has axial thickness approximately equal to the radial dimension of the ring between a ring bore and a ring outer periphery.

13. The combination of claim 1 wherein the ring defines an axis and has axial thickness between ⅜ inch and ¾ inch.

14. The combination of claim 1 wherein the ring defines an axis and is compressed by said cap greater extent at one side of said axis and to lesser extent at the opposite side of said axes.

15. The combination of claim 13 wherein the seal has a radial dimension between a bore and an outer periphery, said radial dimension being between ⅜ inches and ¾ inches, the ring overall diameter being between 2½ inches and 4 inches.

16. The method incorporating the combination of claim 1 and said wall, which includes
   i) tightening said fastener means to compress said seal against said wall and to clamp the test cap unit to said wall, closing said opening,
   ii) connecting external piping to said fitting to rigidly support the fitting,
   iii) applying water pressure internally of said piping and pipe fitting to test whether said elastomeric seal leaks,
   iv) loosening said fastener means and removing said test cap unit, and
   v) connecting a drain cap to said wall to cover said opening by retightening said fastener means to connect the cap to said fitting and to re-compress said seal.

17. The method of claim 16 wherein step ii) includes adhesively connecting said piping to said fitting and to a drain fitting while said test cap unit remains clamped to said wall.

18. The method of claim 16 wherein said steps i) and ii) are also carried out at a second work body wall opening using a second pipe fitting and a second elastomeric seal, said step iii) is also carried out to test whether the second seal leaks, at the same time as the first seal is tested.

* * * * *